(12) United States Patent
Liu et al.

(10) Patent No.: US 11,563,689 B2
(45) Date of Patent: Jan. 24, 2023

(54) CONTAINER-BASED NETWORK FUNCTIONS VIRTUALIZATION PLATFORM

(71) Applicant: HUAZHONG UNIVERSITY OF SCIENCE AND TECHNOLOGY, Wuhan (CN)

(72) Inventors: Fangming Liu, Wuhan (CN); Hai Jin, Wuhan (CN); Miao Li, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 100 days.

(21) Appl. No.: 17/248,519

(22) Filed: Jan. 28, 2021

(65) Prior Publication Data

US 2021/0250299 A1     Aug. 12, 2021

(30) Foreign Application Priority Data

Feb. 7, 2020   (CN) .......................... 202010082931.6

(51) Int. Cl.
| | | |
|---|---|---|
| *H04L 47/2425* | (2022.01) | |
| *G06F 16/22* | (2019.01) | |
| *H04L 41/5006* | (2022.01) | |
| *H04L 41/5019* | (2022.01) | |
| *H04L 41/5041* | (2022.01) | |
| *H04L 47/125* | (2022.01) | |

(52) U.S. Cl.
CPC ...... *H04L 47/2425* (2013.01); *G06F 16/2255* (2019.01); *H04L 41/5006* (2013.01); *H04L 41/5019* (2013.01); *H04L 41/5041* (2013.01); *H04L 47/125* (2013.01)

(58) Field of Classification Search
CPC ............. H04L 47/2425; H04L 41/5006; H04L 41/5019; H04L 41/5041; H04L 47/125; H04L 41/0895; H04L 41/342; H04L 41/40; H04L 41/082; H04L 43/0852; H04L 43/16; H04L 41/0803; H04L 45/7453; G06F 16/2255; G06F 9/5088; G06F 9/505

See application file for complete search history.

(56) References Cited

U.S. PATENT DOCUMENTS

2018/0123943 A1*   5/2018  Lee ........................ H04L 45/28
2019/0132211 A1*   5/2019  Yeung .................... H04L 67/10

* cited by examiner

*Primary Examiner* — Jamal Javaid
*Assistant Examiner* — Shawn D Miller
(74) *Attorney, Agent, or Firm* — Michael X. Ye, Esq.; Rimon Law PC (57) ABSTRACT

The present invention relates to a container-based network function virtualization (NFV) platform, comprising at least one master node and at least one slave node, the master node is configured to, based on interference awareness, assign container-based network functions (NFs) in a master-slave-model-based, distributed computing system that has at least two slave nodes to each said slave node in a manner that relations among characteristics of the to-be-assigned NFs, info of load flows of the to-be-assigned NFs, communication overheads between the individual slave nodes, processing performance inside individual slave nodes, and load statuses inside individual said slave nodes are measured.

16 Claims, 2 Drawing Sheets

CONTAINER-BASED NETWORK FUNCTIONS VIRTUALIZATION PLATFORM

CROSS-REFERENCE TO RELATED APPLICATIONS

This application claims the benefit of the Chinese Patent Application No. CN202010082931.6 filed on Feb. 7, 2020, which is hereby incorporated by reference as if fully set forth herein.

BACKGROUND OF THE INVENTION

1. Technical Field

The present invention relates to field of network virtualization technology, and more particularly to a container-based network functions virtualization platform.

2. Description of Related Art

Network virtualization has become a new hit as the scale of networks continuously grows and numerous, new types of applications and services are increasingly deployed. It provides an effective way to deal with mummification of network structures and significantly enhances networks in terms of flexibility and diversity. In the scenarios of network virtualization, physical network resources having been poolized can be flexibly divided and merged, and then assigned to clients according to practical needs in a logical resource way. Therefore, users can independently deploy and manage the virtual networks they own, without the concerning about realization of physical networks at the bottom layer.

Traditionally, network virtualization is in chief accomplished through expanding network protocols, using packets or implementing network address conversion, with all of these leading to increasingly complicated network protocols. Thus, some researchers tried to make network hardware programmable and control them in a centralized way, thereby separating the control level from the data level. As a result, software-defined network (SDN) has been developed. Then different network providers established Open Flow to standardize communication protocols between the control plane and the forwarding plane. This on one hand defines how data form flows, and on the other hand defines how flows are controlled on demand.

Another branch of network virtualization is network functions virtualization (NFV). NFV was at first proposed by the European Telecommunications Standards Institute (ETSI). NFV allows virtualized network functions to operate with X86-structure hardware that is traditionally for communication use by decoupling software and hardware and by implementing functional abstraction. In this way, network functions no rely on traditional special hardware devices, and datacenters can use servers, storage devices and exchange devices for communication purposes to replace special network element devices. In other words, by only using exiting servers for communication applications, network functions can be realized in the form of software. The emergence of NFV provides new possibilities of hardware resources pooling, fast deployment of network functions and network services, as well as instant engagement of new businesses. This significantly accelerates business deployment, simplifies network deployment, and reduces overheads for special hardware deployment and iterative update.

Network functions (NFs) are functional modules in the traditional network infrastructure, and have fixed internal function and well-defined external ports. NFV is about virtualizing network functions into various software applications to be deployed on virtual resources. Although these virtualized network functions can operate on x86 servers conventionally for communication use, and thus help to save costs for operation and development, their performance is obviously inferior to NFs running on special hardware. In order to improve performance of virtualized network functions, high-performance data plane platforms have been introduced and developed. DPDK avoids the inherent overheads for interrupted processing of core network stack packets that are traditionally required, and allows applications to access data directly through NIC. PF_Ring uses a ring buffer that allows access to user space and core space to realize linear velocity packet capture. Netmap assigns a packet buffer in advance, and implements batch processing to reduce the call time required by the system, thereby achieving zero-copy of the shared memory buffer between the user space and the core space. Virtual network function (VNF) is software implementation of network functions that are traditional based on special hardware in NFV scenarios. Generally, VNF is realized in two main ways: virtual machines (VMs) and containers.

With the introduction and development of high-performance data plane platforms, researchers have proposed and designed many NFV frameworks and NFV platform (or network functions virtualization platforms). For example, ClickOS is a NFV platform realized using XEN and Click modular routers. ClickOS transfers data between light-weight virtual machines on which Click software routing operates by means of netmap and VALE switches. They enhance the network performance of Xen by overcoming the bottleneck of network I/O channels of hypervisors and using ClickOS, a light-weight, fast-activated mini operating system. As a further example, E2 is a DPDK-based framework composed of end-to-end middleware. It comprises placement, resources and meta-data management and service chains. Therein, the data plane development kit DPDK developed by Intel is composed of a set of bases and a drive, and is used for development of high-speed network applications on X86 platforms. In most cases, DPDK runs in the Linux user space. DPDK improves the ability of a communication server to receive and transmit data packets through a series of optimization technologies, so as to make network functions implemented as software on the communication server comparable to those implemented on special hardware devices in terms of speed.

The foregoing NFV frameworks and platforms are all based on the platform virtualization technology called VM. While virtual machines do provide good isolation and portability, virtual machines are known as resource-consuming and adverse to platform scalability. Container is a more light-weight solution for virtualization of operating systems. For scenarios where migration of virtual network functions is not required, this technology is advantageous in terms of resource cost. It uses Namespace characteristics to realize isolation of resources and uses cgroups characteristics to realize resource management, thereby providing a NFV platform with an environment in which VNFs can operate. Compared to virtual machines, containers are advantageously light-weight and fast-activated, and due to omission of the stage of Guest OS, it significantly saves resources, thereby enabling the master to activate more container instances. For example, OpenNetvm is a scalable, efficient DPDK-based packet processing framework. It supports dynamic control of packets using service chains. OpenNetVM deploys network functions in Docker containers, and facilitates development of NFS (Network File System) by different service providers, while minimizing memory consumption and start time. OpenNetvm uses the container-based technology, Docker, to reduce resource consumption and improve performance of every virtual network function. Nevertheless, in its design, every network function needs an exclusive CPU core, and thus the amount of network functions it operates is very limited.

NFs running on a NFV platform have heterogeneous processing demands, and therefore need different CPU resources. However, since an OS scheduler is unable to perceive these demands, it is common that CPU resources are divided equally among communication tasks. CPU resource demands of NFs are determined by the types of NFs and the flow features of their workloads. Flow features include the packet arrival rate, the packet size and the latency requirement of the flow. With other flow features are all the same, between two NFs of the same types, the one having the higher packet arrival rate requires more CPU resources than the other for processing more packets. Equally dividing CPU resources by the OS scheduler can result in some NFs waste CPU resources yet in others fails to meet the performance requirements. Therefore, a NFV platform needs a reasonable CPU resource assignment strategy that supports desired performance of NFs having heterogeneous processing requirements. Additionally, due to fluctuation of the flow rate, workloads on a NFS are time-varying, which means their demands for resources change with the variation of workloads. Static assignment of virtual resources can disadvantageously cause resource waste or violation of SLA.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY

In view of the shortcomings of the prior art, such as CPU resource waste and underperformance of some NFs caused by the strategy of equally dividing performed by the OS scheduler, as well as resource waste or violation of SLA caused by static assignment of virtual resources, the present invention provides a container-based network functions virtualization (NFV) platform. Its objective is to enhance the performance of a system in parallelly processing heterogeneous NFs, thereby ensuring expected performance of heterogeneous flows. Another objective of the present invention is to realize dynamic assignment of virtual resources of containers, thereby ensuring container performance and minimizing resources to be deployed. Additionally, the NFV platform reuses VNF based on CPU reuse activation rules, so as to optimize performance of the NFV platform by sharing a data packet processing module between different VNFs or allowing VNFs to parallelly process data packets.

Specifically: a container-based network function virtualization (NFV) platform, comprising at least one master node and at least one slave node, the master node is configured to, based on interference awareness, assign container-based network functions (NFs) in a master-slave-model-based, distributed computing system that has at least two slave nodes to each said slave node in a manner that relations among characteristics of the to-be-assigned NFs, info of load flows of the to-be-assigned NFs, communication overheads between the individual slave nodes, processing performance inside individual slave nodes, and load statuses inside individual said slave nodes are measured.

This statement is now phrased and summarized for further explanation. The master node serves to assign network functions to each said slave node. Therein, the network functions refer to container-based network functions in a master-slave-model-based, distributed computing system. These network functions run in containers. Therein, the master-slave-model-based, distributed computing system refers to a distributed computing system that has at least two slave nodes and uses a master-slave model. Therein, the network functions are assigned in a manner that the master node measures different information. This is achieved by measuring different information based on interference awareness. Therein, the different information at least comprises the following five categories: characteristics of the to-be-assigned network functions, info of load flows of the to-be-assigned network functions, communication overheads between the individual slave nodes, processing performance inside each said slave node, and load statuses inside individual said slave nodes. Therein, the container-based NFV platform is also referred to as the container-based network functions virtualization platform herein. A container is an environment for the network functions virtualization platform (i.e., the NFV platform) to run virtual network functions (i.e., VNFs). The description above is now further detailed. The phrase "based on interference awareness" can be paraphrased as "based on performance degradation caused by mutual interference between different types of NFs". Preferably, the master node can identify the child node having the least interference by measuring different information based on interference awareness. As proven by the many experiments conducted on the NFV platform, NFs in the same host interfered mutually. Factors having impact on such interference included the amount of the NFs and the types of the NFs. Particularly, different NFs generated mutual interference to different extends. For identifying the pattern, the inventors of the present invention classified the existing NFs according to their functional requirements, and conducted performance measurement by cross combining the NFs of the same or different types, thereby assessing levels of performance degradation caused by mutual interference. In the present invention, the existing NFs are classified into six types. NFs of the first type only read and recognize IPs of packets, such as for gateways. NFs of the second type read and recognize IPs and ports of packets, such as for firewalls and surveillance. NFs of the third type read and recognize IPs, ports and contents of packets, such as for NIDS. NFs of the fourth type read and write IPs of packets, such as for load balancing and agency. NFs of the fifth type read and write IPs and ports of packets, such as NAT. NFs of the sixth type read and write IPs, ports and contents of packets, such as for encryption and decryption. In a datacenter, NFs of the third three types jointly take up a share of 75% or more, and NFs of the last type take up a share of 5% or less. Description is now directed to "characteristics of the to-be-assigned network functions" and "info of load flows of the to-be-assigned network functions". The characteristics of the to-be-assigned network functions at least comprise the types of the network functions (NFs). The measurement results taken from the foregoing earlier experiments demonstrate that NFs of different types require different sizes of CPU resources. Given that the NFs have the same load level, or that the flow features of the flows on the NFs are the same, the more complicated the processing functions of the NFs are, the more CPU resources are required. For example, an NF performing encryption requires more CPU resources than a NF performing simple routing. Given that the NFs are of the same type, when the loads on the NFs load are different, or, the flow features of the flows on the NFs are different, the CPU resources required by the NFs are different. The info of load flows of the to-be-assigned network functions may be flow features, and the flow features having impact on the CPU resource demands at least comprises the flow rate, the packet size, and the latency requirements. Given that the NFs are of the same type and all the other flow features are the same, the greater flow rate means that the NF requires more CPU resources. Similarly, given that the NFs are of the same type and all the other flow features are the same, the greater size of the packet in the flow means that the NF requires more CPU resources. Given that the NFs are of the same type and other flow features are the same, the shorter latency required by the NF means that NF uses more CPU resources. Description is now directed to "communication overheads between the individual slave nodes", "processing performance inside each said slave node" and "load statuses inside individual said slave nodes". A master control program on the master node creates and maintains a global resource assignment table. The global resource assignment table contains at least comprises the aforementioned types of information. The global resource assignment table records resource assignment of the individual child nodes, and supports dynamic expansion. Variables in the global resource table data structure at least comprises child node IDs, core IDs, sizes of the CPU resources of the core that have been assigned, instance IDs of instances of the NFS that are stored in the core, and CPU resource sizes assigned for the individual NFs. After CPU resources have been assigned and a NF is created, the master control program looks up the global resource table to identify a suitable child node according to the CPU resources required by the NF, and select a core on the child node having the least interference for placement. This process is referred to as initial NF placement and resource assignment.

According to one preferred embodiment, the container-based network function virtualization (NFV) platform at least comprises a master-node NF scheduling module, a master-slave communication module, and a slave-node NF managing module, in which, the master-node NF scheduling module is configured to perform one or more of the following steps: initializing a flow table; checking the flow table to perform packet forwarding; and creating NFs for data packets of a new flow and allocating CPU resources, the master-slave communication module is configured to perform one or more of the following steps: checking a master-node container IP conversion table IDP, so as to convert an instance ID of a target NF into an IP of a container to which the target NF belongs; and forwarding a packet to the container having the corresponding IP through a cross-host communication network flannel between the containers, and the slave-node NF managing module at least comprises a monitoring module for monitoring running statuses of the NFs and a resource isolating module for realizing resource isolation between different NFs.

Preferably, the data structure of the master-node NF scheduling module comprises: a flow table ft for recording flows that are already on the platform, a status information structure node_status for recording the status of each said slave node, quintuple information 5tuple of packets, and flow features of the relevant flows (which at least comprise the flow rate, the latency, the required NF service chain sc, etc.).

Preferably, a flannel network is built to realize packet forwarding to the slave node and between containers of the slave nodes. The flannel runs flanneld in individual nodes as agents. The flanneld, for the node in which it is present, acquires a small sub-network from the network address space of the cluster of the master node and slave nodes, and IP addresses of all containers in that node will be assigned from the sub-network. The flanneld stores the sub-network acquired for that node and a public network IP used for inter-node communication using an etcd. The flanneld on each node can ascertain the mapping relation between other sub-networks and other node public network IPs through watching the etcds. The flannel packages packets using hostgw, thereby realizing packet forwarding between the nodes. Since the nodes are in the same sub-network, they can access each other directly, so the public network IP of the forwarding target node can be directly set as the gateway.

According to one preferred embodiment, the step of initializing the flow table at least comprises one or more of the following operations: setting up various parameters for a hash table; calling and using a hash table creation function rte_hash_create of a data plane development kit (DPDK) to create the hash table of the flow table; pre-allocating space for flow table entries of the flow table; and obtaining the flow table ft according to the generated hash table and the flow table entry flow_entryto, the step of checking the flow table to perform packet forwarding at least comprises one or more of the following operations: in the hash table, looking for a key-value pair that corresponds to quintuple information of the currently arriving data packet; and where the corresponding key-value pair that corresponds to quintuple information of the currently arriving data packet is found, identifying a corresponding NF service chain in the flow table entry, and transmitting the packet to the corresponding NF service chain, and the step of creating the NFs for the data packet of the new flow and allocating the CPU resources at least comprises one or more of the following operations: in the hash table, looking for the key-value pair that corresponds to the quintuple information of the currently arriving data packet; and where the corresponding key-value pair is not found, reading a configuration file, creating the NF service chain required by the flow, inserting the corresponding key-value pair into the hash table and inserting the corresponding flow table entry into the flow table, and allocating the CPU resources according to the info of the flow to which the data packet belongs.

Specifically, the hash parameters (rte_hash_parameters) of the hash table at least comprise one or more of the name of the hash table, the maximum number of entries of the hash table, the key length key_len, the hash function rte_hash_function, the hash function initial value hash_func_init_val, and the NUMA socket socket_id. Preferably, a flow table ft is generated according to the generated hash table and a flow table entry flow_entry. Therein, entries in the flow table at least comprise one or more of the quintuple information 5tuple of data packets in the flow, the NF service chain sc it belongs to, the packet count information packet_countdata, and the byte count information byte_count. Therein, the quintuple information at least comprises the source IP address src_ip, the source port src_port, the target port dst_ip, the target port dst_port and the protocol proto.

Therein, the name parameter of the hash table is set as a string s containing the currently running rte_lcore_id( ) and the number of system time cycles rte_get_tsc_cycles( ). The maximum number parameter of entries of the hash table is set by default as the maximum number of the entries of the flow table. The key length parameter of the hash table is set as the size of the quintuple data structure of the data packet. The hash function parameter of the hash table is set as a hash function rte_jhash provided by the data plane development kit DPDK. The hash function initial value parameter of the hash table is set as 0. The NUM Asocket parameter of the hash table is obtained using a function rte_socket_id provided by the data plane development kit DPDK.

According to one preferred embodiment, the master-node NF scheduling module is configured to perform one or more of the following steps: for the arriving data packet, calling and using a function rte_hash_lookup_with_hash provided by the DPDK to check the flow table based on the quintuple information at a packet header of the arriving data packet, if the corresponding flow table entry matching the quintuple information of the arriving data packet is found, identifying the corresponding NF service chain in the flow table entry, and transmitting the packet to the corresponding NF service chain, which is the NF having a first NF instance ID of the service chain, and if the corresponding flow table entry matching the quintuple information of the arriving data packet is not found, reading the configuration file, according to quintuple information match flow rules of the packet, creating a required NF instance, and calling and using a function rte_hash_add_key_with_hash provided by the DPDK to add a new key-value pair to the hash of the flow table, and to add a new flow table entry to the flow table.

According to one preferred embodiment, the master-node NF scheduling module is configured to perform one or more of the following steps: according to the flow info of the flow to which the arriving data packet belongs, allocating the CPU resources to each said NF in the newly created NF service chain according to a CPU resource assignment strategy, and checking each said child node for its NF assignment status and CPU resource usage status, and placing the NFs on the child nodes according to a NF placement strategy, in which, the CPU resource assignment strategy refers to reasonable assignment of the CPU resources to each said NF in the newly created NF service chain using cgroups based on measurement experiment experience, the NF placement strategy refers to selecting at least one child node that satisfies an assignment condition from a plurality of child nodes based on the assignment condition that a size of the idle CPU resources on the child node is greater than a size of CPU resources required by the NF, and placing NF on the child node that has the least interference based on interference-awareness status.

Preferably, the flow features mainly include the packet size, the flow rate and the latency requirements. As proven by a large amount of measurement experiments, for conforming to the relevant Service-Level Agreement (SLA), NFs may need different CPU resources to satisfy flows with different flow features even of the NFs are of the same type.

According to one preferred embodiment, at least one said slave node is provided with at least one said monitoring module, and the monitoring module is configured to perform one or more of the following steps: repeatedly reading a data structure of the NF through polling so as to monitor a packet arrival rate and packet latency of the flow, and dynamically adjusting the CPU resource assignment to the NF according to a variation of a demand of the flow, and where a difference between a current packet arrival rate and a previous packet arrival rate recorded in the data structure of the NF is greater than a preset threshold, or where an average latency is greater than an SLA-based maximum packet latency of the flow to which the packet belongs, reallocating the CPU resources to the NF.

Preferably, the container-based NFV platform maintains a global resource assignment table, which records serial numbers of child nodes in which individual NFs are present and the CPU resources assigned thereto. Each NF corresponds to a data structure table, which records the statuses of the NF, such as the precious packet arrival rate, the current packet arrival rate, and the average packet latency. The packet arrival rate is obtained by collecting statistics of the packet arrival rate in the ring of every NF. This may be achieved by computing the rate at which the rx thread of the master node enqueue the packets into the queue of the ring of the first NF or the rate at which the tx thread of the previous NF enqueue the packets into the queue of the ring of the next NF. The packet latency is obtained by computing the difference between the time the rx thread of the master node makes the timestamp and the time the tx thread reads the timestamp.

According to one preferred embodiment, the monitoring module is further configured to perform one or more of the following steps: monitoring the flow info of the flow it serves and resource usage statuses of the individual NFs, according to variations of the flow info of the flow each said NF serves, correspondingly adjusting the resources the NFs serve, and signaling the master node to modify a global resource table, and at a fine-grained bottom layer, statistically managing the resource usage statuses of the NFs accordingly, so as to realize isolation of the CPU resources among the NFs.

Preferably, CPU resources can be effectively saved by reusing the NFs. As demonstrated by the many measurement experiments conducted on the container-based NFV platform, the load on a network function, or the packet arrival rate of the relevant flow, is not in linear relation with the required CPU resources. Increase of the number of NFs on a single core can cause huge additional CPU overheads, such as process switching overheads. Thus, reuse of NFs helps to reduce the number of required NFs, thereby reducing additional CPU overheads and saving CPU resources.

A container-based network functions virtualization (NFV) method, at least comprising one or more of the following steps: having a master node based on interference awareness, assign container-based network functions (NFs) in a master-slave-model-based, distributed computing system that has at least two slave nodes to each said slave node in a manner that relations among characteristics of the NFs, info of load flows of the to-be-assigned NFs, communication overheads between the individual slave nodes, processing performance inside individual slave nodes, and load statuses inside individual said slave nodes are measured, thereby providing the system with NF services, balancing loads among the nodes and adapting the system to dynamic load fluctuation of the flow.

According to one preferred embodiment, the NFV method at least comprising providing a master-node NF scheduling module, a master-slave communication module, and a slave-node NF managing module, the slave-node NF managing module at least comprising a monitoring module and a resource isolating module, wherein, the master-node NF scheduling module performs one or more steps of initializing a flow table; checking the flow table to perform packet forwarding; and creating NFs for data packets of a new flow and allocating CPU resources; the master-slave communication module performs one or more of the following steps: checking a master-node container IP conversion table IDP, so as to convert an instance ID of a target NF into an IP of a container to which the target NF belongs: and forwarding a packet to the container having the corresponding IP through a cross-host communication network flannel between the containers, and the monitoring module monitors running statuses of the NFs, and the resource isolating module realizes isolation of the CPU resources between different NFs.

Preferably, the master node places NFs onto the slave nodes and dynamically assigns resources to the NFs, while the slave nodes perform the NFs and monitor the statuses of the NFs.

A NF management framework, being provided by a container-based network functions virtualization (NFV) platform, and being configured to: for any arriving packet, use the container-based NFV platform to perform one or more of checking a flow table, performing transmission over a custom NF service chain, and monitoring a flow to which the arriving packet belongs; and for any NF, use the container-based NFV platform to perform one or more of creation, dynamic resource assignment, migration, destruction, and reuse based on CPU reuse rules, in which, the CPU reuse rules at least comprises one or more of R1 through R4, R1: there is an NF in the service chain required by the flow that is of the same type as the reused NF; R2: the flow and all the flows on the reused NF are trustable to each other without one said flow maliciously preempting a CPU processing time for another said flow: R3: after the reuse, SLA demands of all the flows of the reused NF are satisfied; R4: after the reuse, an overall CPU resource use rate decrease.

The container-based NFV platform of the present invention at least provides one or more of the following advantages:

(1) The container-based NFV platform of the present invention provide a light-weight and efficient multi-node NF management framework, which uses a flow table and a container IP conversion table IDP to realize flexible packet forwarding among multiple nodes, and uses the container technology to provide NFs that are highly isolatable, easy to deploy and highly scalable to process arriving packets.

(2) The container-based NFV platform of the present invention provides a NFV network that provides a NFV network with a dynamic, fine-grained resources management framework, which considers flow features and empirical measurement results and assigns every NF with the most suitable child node, the most suitable CPU core and the most effective CPU resources according to a global resource assignment table.

(3) The container-based NFV platform of the present invention allows real-time flow watch and dynamic resource adjustment. By means of information collecting and computation, the container-based NFV platform can real-time monitor the packet arrival rate, packet loss and processing latency on every NF. According to these data, the container-based NFV platform can use cgroup to dynamically adjust the CPU resource assignment for NFs by changing the CPU resource assignment percentage and the CPU core in which the NF is present. This can even include adjusting the position of the child node in which the NF is present.

(4) The container-based NFV platform of the present invention support reuse of NFs to effectively save CPU resources, increase throughput and reduce latency. By creating sub-flow table within the NF, the NF after processing packets can forward the packets to different target NFs according to the quintuples of the packets.

DETAILED DESCRIPTION

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the embodiments described and depicted herein are intended for reference and illustration, but not to limit the present invention. The technical features referred in different embodiments may be combined with each other in any manner as long as such combination forms no conflicts.

Figure 1:
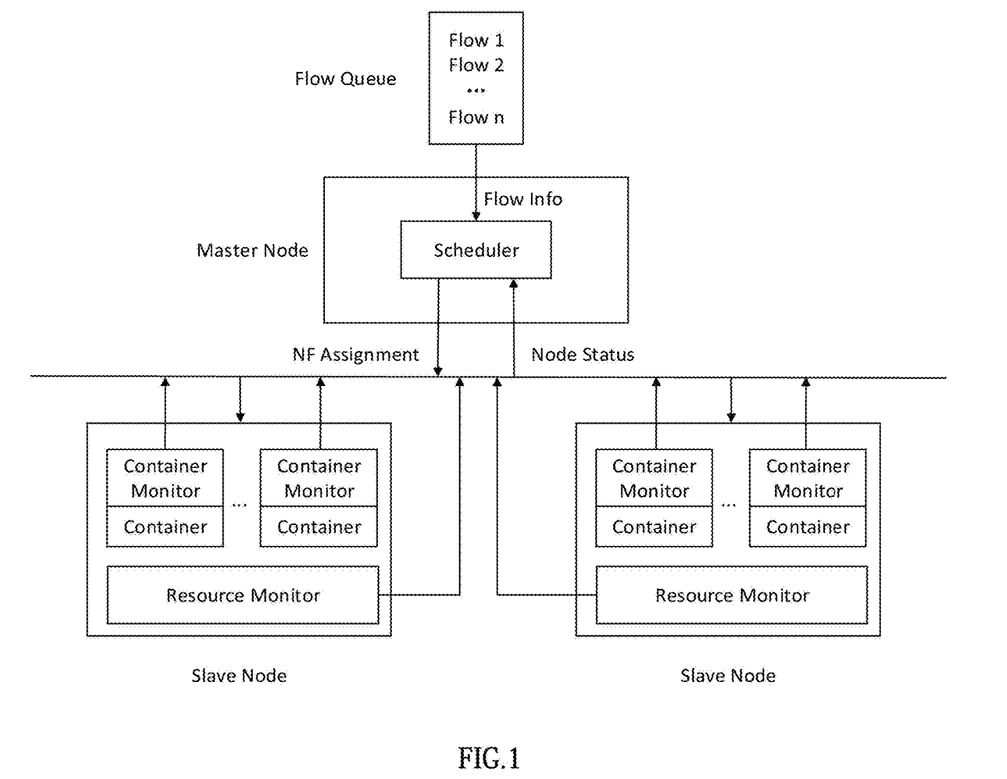
FIG. 1 is a brief system structural diagram of a container-based NFV platform of the present invention.
Figure 2:
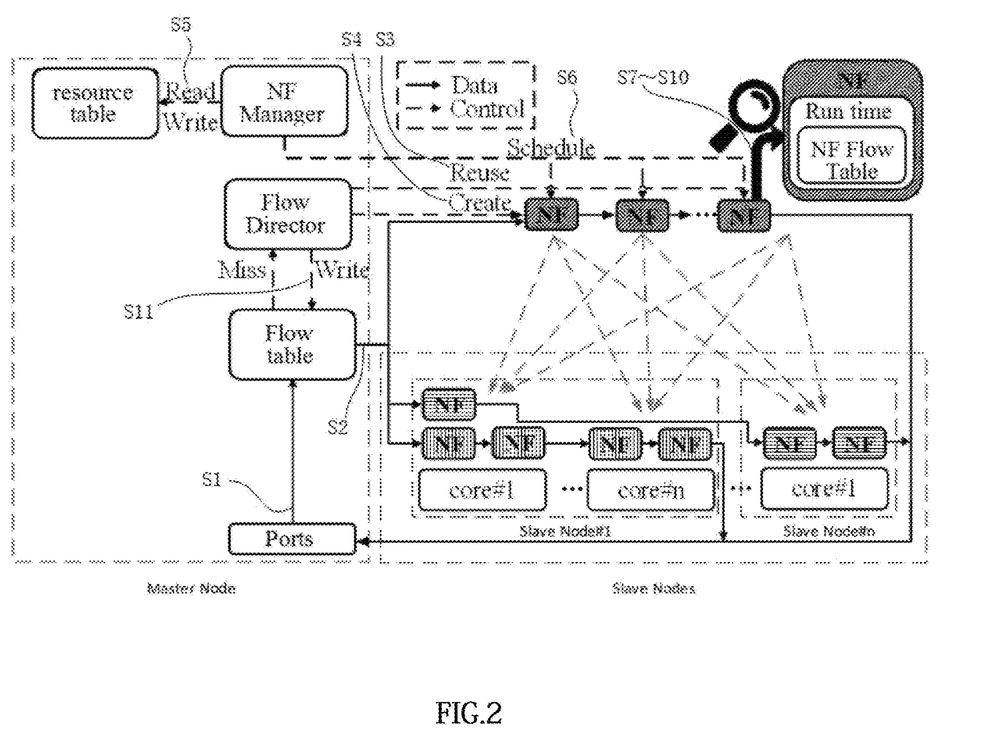
FIG. 2 is a brief procedural diagram of processing for an arriving packet according to the present invention.

Before detailing the technical scheme of the present invention, the system structure of the disclosed container-based NFV platform is briefly introduced. FIG. 1 is a brief system structural diagram of a container-based NFV platform of the present invention. FIG. 2 is a brief procedural diagram of processing for an arriving packet according to the present invention. For easy understanding, the steps depicted in FIG. 1 and FIG. 2 are detailed below:

| FIG. 1 | Description | FIG. 2 | Description |
|---|---|---|---|
| Master Node | Parent node | Resource table | Global resource table |
| Slave Node | Slave node/ Child node | NF manager | Slave node network function managing module |
| scheduler | Master-node NF scheduling module | Write | Writing assignment results of NFs back to the global resource assignment table |
| flow queue | Flow queue | Read | Looking up global resource assignment table |
| Flow info | Flow feature | Flow table | Flow table |
| NF Assignment | Assignment of network functions | Ports | Network interface card ports, through which the network interface card port batch reads data packets in batches (i.e., Step S1) |
| Node Status | Status information of a slave node | Schedule | According to a NF assignment result, allocating a container created on an assigned child node with corresponding resources, and sending the initialization configuration data structure of the NF to a target child node through a flannel network (i.e., Step S6) |

| FIG. 1 | Description | FIG. 2 | Description |
|---|---|---|---|
| Container monitor | monitoring module | Reuse | Activating reuse of a NF (i.e., Step S3) |
| Container | container | Create | Create a new NF service chain according to the service requirements of the flow (i.e., Step S4) |
| resource monitor | Resources monitoring module | Core#1~core#n | CPU core |
| | | Run time | The dynamic data structure of an NF during operation, comprising the flow table |
| | | NF Flow Table | The flow table of a NF |
| | | Data | Data transmission |
| | | Control | A control instruction |
| | | Write | Writing entries of a new flow into the flow table |
| | | Miss | A flow table not hitting the target, indicating that the flow is a new one |
| | | Flow director | A flow managing module, for creating the NF chain required by the flow and transmitting the flow in the NF chain |

FIG. 1 shows a container-based NFV platform that at least comprises two types of nodes. The platform at least comprises a master node for managing NFs and scheduling resources. The platform at least comprises a child node for running the NFs and recording statuses of the NFs. The platform primarily serves to receive packets, and create an NF service chain according to demands of the packets, while performing initial placement and resource assignment; or forward packets to its NF service chain for packet processing, and compute and monitor the arrival rate and the processing latency of packets, thereby achieving dynamic adjustment of resource assignment. For two flows that satisfy reuse conditions the platform can reuse NFs to save CPU resources.

According to one preferred mode, a master-node NF scheduling module for dealing with the master node is configured to perform one or more of the following steps:

1. Initialization master control program (Steps S4~S11). Herein, the shared memory, the flow table, the container IP conversion table IDP and the global resource assignment table are initialized. Threads rx and tx are created. The rx thread calls for the rte_eth_rx_burst function of the DPDK to read packets using a network interface card and process the packets. An instance ID of a target NF is determined using the flow table. The IP address of the container in which the target NF is present is determined using the container IP conversion table IDP. The tx thread calls for the onvm_pkt_enqueue_port function of the DPDK to send the packets from the master node to the container on a child node in which the target NF is present through a flannel network.

2. Creation of NFs (Steps S4~S11) and destruction NFs (Step S14). CPU resources are assigned to NFs according to the flow features of the load on the NFs. A CPU core on the child node is bound to each NF according to the global resource table. The NF configuration structure is initialized, and instance IDs are assigned to the NFs. Communication is made to the child nodes for updating the statuses of the NFs, so as to complete initialization and creation of the NFs. After successful creation of the NFs, the information of the service chains in which the NFs are present is written into the flow table. The information of resource assignment to the NFs is written into the global resource assignment table. When the load flow on a NF ends, the NF is destructed. The master control program alters the running semaphore of the NF, and directs the child node to end the NF running process and clean the data structure related to the NF. After successful destruction, the master control program recovers the assigned instance ID, and deletes corresponding entries in the flow table and in the global resource table.

3. Dynamic assignment of CPU resources (Step S12). When the flow rate changes, the master control program receives the NF status information form the child node. The master control program then reassigns the CPU resources according to the change in the status of the NF, or the flow rate. If the core in which the NF is present can satisfy the CPU demand of the NF, it alters the size of the resources assigned to the NF directly. If the core in which the NF is present is unable to satisfy the CPU demand of the NF, the NF is migrated to another core. If the same child node has a core that can satisfy the resource demand of the NF, cgroup is used to rebind the core for the NF. If there is no core in the same child node that can satisfy the resource demands of the NF, the NF is moved to another node.

According to one preferred mode, a slave-node NF managing module dealing with the child nodes is configured to perform one or more of the following steps:

1. Operation of NFs (Step S3). The NF on the child node runs in a container. Data packets are read through the network interface card port using the DPDK for processing. After processing, if the NF is not the last NF in the service chain, the data packets are enqueued into the queue of the ring of the next target NF. If the NF is the last NF in the service chain, the data packet is sent out from the port.

2. Monitoring of NFs (Step S3). The child node monitors the NF in the container. The objects to be monitored at least comprise one or more of the packet arrival rate, the packet processing time, and the actual CPU use of the NF. Then the information is fed back to the master node through the flannel network.

According to one preferred mode, a brief procedure for processing an arriving packet performed by the container-based NFV platform is as shown in FIG. 2. The procedure at least comprises one or more of the following steps:

Step S1: The rx thread of the master control program on the master node repeatedly checks whether there is a packet at any of the ports as shown in FIG. 2 (i.e., the network interface card port). If there is an arriving packet, the rte_eth_rx_burst function is called from the DPDK to read the data packet through the network interface card port in a batch manner. Then the storage address of the data packet is stored in the cache of the rx thread of the master control program. Afterward, the IP protocol and the source/target address and ports are read. The hash value of the quintuple is obtained using the rte_jhash function. Then it is to be checked whether there is a matching entry in the flow table as shown in FIG. 2. The matching entry means the hash of the packet and the hash value recorded in the entry are equal. If there is an entry having the same hash value, and the quintuple of the packet is the same as the quintuple recorded in the flow table, it is proven that the packet belongs to an existing flow, so the procedure is proceeded with Step (S2). If there is not an entry having the same hash value, it indicates that the packet belongs to a new flow. According to the specified NF reuse rules, it is to be determined whether there is an NF in any child node that satisfies the rules for reuse. If there is, then the process goes to Step (S3). If none of the child nodes has an NF satisfying the reuse conditions, the procedure goes to Step (S4).

Step S2: according to the service ID of the target NF as recorded in the entry, the container IP of the target NF is determined by checking the container IP conversion table IDP, and then the packet is transmitted to the created service chain it needs through the built flannel network.

Step S3: The reuse-activating flag of the reused NF is checked. If the reuse-activating flag of the reused NF is 1, it indicates that the NF has been activated for reuse. In this case, a new entry is added into a new flow to which the packet belongs to record the quintuple of the new flow and the IP of the container in which the next target NF is present. If the reuse-activating flag of the reused NF is 0, it indicates that the NF has not been activated for reuse. In this case, a sub-flow table has to be created, and each of the old flow on the NF and the new flow is added with one entry to record the quintuples of the old flow and the new flow, respectively, and the IP of the container in which the next target NF is present.

Step S4: A new NF service chain is created according to the service requirements of this flow. Preparation for the creation of an NF includes initializing configuration related to the NF, initializing of the running semaphore of the NF, setting up signal processing functions, and initializing the function menu of the NF, which comprises four functions, namely NF setting-up function, NF information processing function, NF callback function and NF packet processing function. The subsequent works are reading the command parameters of the NF, initializing the operational environment, and then waiting for assignment of the child node and the CPU core, as well as the size of the CPU resources for NF running. Then the procedure turns to Step (S5).

Step S5: For every NF, the required CPU resources are determined according to the packet size of the flow, the packet arrival rate, the latency requirements and the NF type. Then child nodes that satisfy the assignment conditions, or, whose idle CPU resources are greater than the CPU resources required by the NF, are identified by checking the global resource assignment table. If there are plural child nodes satisfying the conditions, the NF is place on the child node that has the least interference. Afterward, the ID of the CPU core satisfying the resource assignment demand of the NF is determined, and the assignment result of the NF is written back to the global resource assignment table. Then the procedure turns to Step (S6).

Step S6: A container is created on the assigned child node according to the assignment result of the NF, and the initialization configuration data structure of the NF is transmitted to the target child node through the flannel network. After receiving the initialization configuration data structure of the NF, the child node runs the program in the newly created container according to the configuration to create the NF. First, the command parameters for calling for the NF is read. The running environment DPDK is initialized. By calling for the DPDK function rte_thread_set_affinity, the thread of the NF is bound to the specified CPU core. The CPU resource size used by the NF is then limited by setting the value of CPU quota cpu.cfs_quota_us in cgroup. The sequent works include allocating the shared memory for the NF and recording the shared memory addresses, which comprise the ring memory address, the NF data structure memory address, the configuration information structure address, the port information memory address and so on. Afterward, the configuration information of the NF is initialized, and the ID of the core in which the NF runs is set as the assigned core ID. As to the running time limit and the processing packet quantity limit, if there is no such a limit, the value is set as 0. The instance of the NF is set as NF_NO_ID, and the status of the NF is set as NF_WAITING_FOR_ID. From the memory pool used for message transmission between the master control program and the NF, a message structure is extracted. The message type is set as MSG_NF_STARTING and the message data include the configuration information of the NF. Then the message is transmitted to the master node through the flannel network, and is enqueued into the message queue of the master control program of the master node. The message is equivalent to a notification to the master control program that the NF is requiring for activation. Then the procedure turns to Step (S7).

Step S7: The master control program will continuously check its message queue to see whether there is a new message. The amount of the messages in the message queue is read, if the amount is greater than zero, all the messages in the message queue are dequeued. When the master control program receives a message from the NF that is of a MSG_NF_STARTING type, the master control program assigns an instance ID for the NF. This instance ID is unique, different from the instance IDs of any other existing NF. Then the instance ID on the NF configuration data structure is updated, and the status of the NF is changed to NF_STARTING. The updated NF configuration data structure is put into a message that is transmitted to the target container on the target child node through the flannel network. The message is then enqueued to the message queue of the NF. Then the procedure turns to Step (S8).

Step S8: After the NF receives the message, the status of the NF is updated to NF_STARTING. At this time, the running semaphore init_finished of the NF is set as 1, indicating that initialization of the NF is completed. A message structure is extracted from the memory pool used for message transmission between the master control program and the NF, whose message type is set as MSG_NF_READY. The message data form the information data structure of the NF. Then the message is transmitted to the master node through the flannel network, and enqueued into the message queue of the master control program on the master node. This message is for notifying the master control program that the NF is ready for packet processing. Then the procedure turns to Step (S9).

Step S9: When the master control program receives a message having a message type of MSG_NF_READY from the NF, it adds 1 to the count of the NFs, and updates the status of the NF as NF_RUNNING. Then the updated message of the status of the NF is transmitted to the target container on the target child node through the flannel network, and the message is enqueued into the message queue of the NF. Then the procedure turns to Step (S10).

Step S10: After the NF receives the message, the status of the NF is updated to NF_RUNNING, meaning that initialization of the NF is completed and the NF is put into running. Then the NF starts to perform the NF setting functions and packet processing function as recorded in its function menu. The NF receives and processes arriving packets. Then the procedure turns to Step (S11).

Step S1: After all the NFs of the NF service chain required by the flow are created, the master control program on the master node writes the hash value of the new flow and the instance IDs of the NFs in the newly created NF service chain into the flow table.

According to one preferred mode, a NF management framework provided by the container-based NFV platform is detailed below for further explaining the foregoing steps.

The steps S1~S15 as described in the following paragraphs correspond to their counterparts S1~S15 as stated above, respectively.

Preferably, the NF management framework is configured to: for any arriving packet, perform one or more of Step S1 (checking the flow table), Step S2 (transmitting in custom NF service chain), and Step S3 (monitoring the flow it belongs); and for any NF, perform one or more of Steps S4~S11 (creation), Step S12 (dynamically allocating resources), Step S13 (migration), Step S14 (destruction), and Step S15 (reuse).

Step S1 (checking the flow table) at least comprises: acquiring the quintuple information key of the packet head of the arriving packet and the hash value hash.rss of the pre-computing key, and checking the hash table of the flow table. Preferably, the packet heads of the arriving packets are read, and the quintuple information key is filled. Therein, the quintuple information at least comprises one or more of the source IP address src_ip, the source port src_port, the target port dst_ip, the target port dst_port and the protocol proto of the arriving packet. Preferably, the hash table of the DPDK is called for checking the function rte_hash_lookup_with_hash. Parameters are entered for checking the hash table in the flow table data structure. The parameters at least comprise the hash values hash.rss of the packet quintuple information key and of the pre-computing key. More preferably, if the returned value is −ENOENT, it indicates that there is no key value found in the hash table, meaning that the packet does not belong to any flow existing in the platform. In other words, the packet belongs to a new flow that needs a new NF service chain to be customized according to its demands. If the returned value is positive, it indicates that the packet belongs to an existing flow, and the returned value is to be taken as an offset of the data array in the data structure of the flow table. The offset of the data array in the data structure of the flow table is unique to the key. According to the returned value, the corresponding flow table entry is found from the data array of the flow table entry stored in the flow table data structure to read the instance ID of the target NF transmitted by the packet. Furthermore, after the instance ID of the target NF transmitted by the packet is read, it is enquired into a master-node container IP conversion table IDP, so as to convert the instance ID of the target NF into the IP of the container the NF is present. Then the packet is forwarded to the container having the corresponding IP through the cross-host flannel network between the containers. Therein, the master node container IP conversion table IDP records the one-to-one mapping relation between the instance IDs of the NFs and the IPs of the containers in which the NFs are present. The container IP is assigned by the flanneld running in the host assignment. The flannel uses etcds to store the network configuration of the entire cluster, wherein the most important content is the network address space for the cluster to be located.

Step S2 where transmission is performed over the customized NF service chain at least comprises: after the instance ID of the target NF for packet transmission according to the result of checking the flow table, obtaining the IP of the container in which the target NF is present, and transmitting the packet to the container in which the target NF is present.

Step S3 about monitoring the flow at least comprises: counting the sum pkt_sum of arriving packets of every flow, and computing the packet arrival rate pkt_num and the packet average latency avg_latency. The monitoring module at least comprises a flow rate monitoring module and a latency monitoring module. The monitoring operation requires additional steps for data collection and computation, which means additional computation overheads. As a solution to this, global variables MEASURE_RT and MEASURE_LA are set. When MEASURE_RT is 1, it means that the sum of the arriving packets is to be counted. When MEASURE_RT is 0, no such counting operation will be performed. When MEASURE_LA is 1, the total latency time is to be measured. When MEASURE_LA is 0, no such measurement will be conducted. Preferably, the platform further includes a time frequency variable for computation of the collected data and output the result. This variable is 1 s by default. In other words, the packet arrival rate and the packet average latency are computed according to the sum of the arriving packets and the total latency time once every other second. Preferably, a user may dynamically adjust the values of the variables according to practical needs, and determine whether to activate these monitoring modules, as well as the frequency for outputting the monitor data.

Preferably, by monitoring the flow rate, information about packets passing through the network interface card port as well as the threads rx and tx of every NF can be collected and summarized. Since the DPDK supports parallel processing of multiple packets for efficient input and output, the rx thread at the network interface card port puts a certain amount of the packets read from the network interface card in a batch manner into its own data structure, so as to eliminate the need of repeated copying the packets. What is stored here is not packet data but the address of where the packets are stored. The batch processing covers 32 packets by default, which means that 32 packets are read at the same time. However, the actual number of the packets getting read can be ≤32 because the number of packets in the network interface card queue may be smaller than 32. After every session of reading, the number of packets that have been actually read is added to the rx statistic of the port statistic data structure. After the rx queue reads packets in batches from the network interface card, it reads the heads of the packets and fills the quintuple information key. The flow is classified according to the quintuple information, and the instance ID of the target NF is then determined using the flow table. Then the packets are enqueued into the ring queue of the target NF. The rx thread of the NF will keep checking whether there is any packet in its ring queue. If there is a packet, the rx thread reads a certain number of packets from the ring in a batch manner and puts them into its own data structure. This can similarly eliminate the need of repeatedly copying the packets. What is stored here is also the address of where the packets are stored but not packet data. The batch processing also covers 32 packets by default, which means that 32 packets are read at the same time. However, the actual number of the packets getting read can be smaller than or equal to 32 because the number of packets in the network interface card queue may be smaller than 32. After every session of reading, the number of packets that have been actually read is added to the rx statistic of the port statistic data structure. If NFs are not to be reused, the NF when created is assigned with the instance ID of the next target NF, or is assigned with an output port. If the NF is not the last NF in the NF service chain of the flow in which the packet is present and the next target NF is on the same node, the tx thread of the NF, after processing the packet, enqueues the packet to the ring queue of the next target NF. If the NF is the last NF in the NF service chain of the flow in which the packet is present or the next target NF is not on the same node, the tx thread of the NF, after processing the packet, enqueues the packet into the send queue of the port. After every enqueuing operation, the number of the packets that have been actually enqueued is added to the tx statistic of the NF statistic data structure. The tx thread of the port sends out the enqueued packets from the port, and add the number of the packets that have been actually sent out from the port to the tx statistic of the port statistic data structure. Then main thread computes the rates at which the port and every NF receive and transmit packets according to these data once every other second. The tx enqueuing rate at the port or at the previous NF may be regarded as the packet arrival rate of the NF.

Preferably, by monitoring the latency, the packet processing latency is monitored. After the rx thread of the network interface card port reads packets from the network interface card in a batch manner, it timestamps the packets. Every NF, after processing the packets, reads the timestamps of the packets as well as the current system time by calling the system. Then can be calculated by subtracting the timestamp from the current system time total processing time of the packet of the current NF, and the packet total processing time of the current NF can be obtained by further subtracting the packet total processing time of the previous NF. After the packet passes through the last NF in the NF service chain of the flow in which it presents, the tx thread of the network interface card port sends the packet out of the port, and reads the current system time by calling the system. Then the total processing time of the packet throughout the NF service chain can be obtained by subtracting the timestamp from the current system time. The obtained result is the processing latency. The main thread calculates the average processing times of different stages for the flow in which the packet is present to proceed from the port to go through every NF and to leave from the port according to these data every other second. Therein, the average processing time beginning from the time the flow enters the port and the time the flow leaves the port can be regarded as the average latency of the NF.

The step of creating the NF at least comprises one or more of initializing the NF, allocating the instance ID and allocating the corresponding memory space.

Preferably, after the command for creating a NF is called, initialization of NF running semaphore is first performed. Therein, running is set as 1, init_finished is set as 0, and stopped is set as 0. The signal processing function is set. If a SIGINT or SIGTERM signal is met, operation of the NF is ended. In other words, running is set as 0, and stopped is set as 1. If init_finished is 0, it means that the NF has not finished the initialization yet. If init_finished is 1, it means that the NF has finished the initialization, and then the nf_clean function has to be called for data deletion of, for example, the memory of the NF. Afterward, the function menu of the NF is initialized, and memory functions are assigned thereto. Preferably, the function menu contains four function pointers, including the NF setting function pointer, the NF information processing function pointer, the NF callback function pointer, and the NF packet processing function pointer. Then the command parameters for calling the NF is read. The running environment DPDK is initialized. The shared memory address pre-assigned by the master control program is identified. The shared memory address at least comprises one or more of the ring memory address, the NF data structure memory address, the configuration information structure address, and the port information memory address. Afterward, the configuration information of the NF is initialized, and setting of the ID of the core for the NF to run therein, the running time limit and the processing packet quantity limit are set. If there is no limit, the ID of the core for the NF to run therein is set as 0, the instance of the NF is set as NF_NO_ID, and the status of the NF is set as NF_WAITING_FOR_ID.

Preferably, from the memory pool used for message transmission between the master control program and the NF, a message structure is extracted. The message type is set as MSG_NF_STARTING, and the message data include the configuration information of the NF. Then the message is enqueued into the message queue of the master control program. The message is equivalent to a notification to the master control program that the NF is requiring for activation. The master control program will continuously check its message queue to see whether there is a new message. The amount of the messages in the message queue is read, if the amount is greater than zero, all the messages in the message queue are dequeued. For every one message, the type variable in the message structure is read. The master control program performs different operations for messages of different types. When the master control program receives a message from the NF that is of the MSG_NF_STARTING type, the master control program assigns an instance ID for the NF. This instance ID is unique, different from the instance IDs of any other existing NF. Usually, a variable is used to record the number of NFs that have been created. The instance ID of the newly created NF is the variable plus 1. If the value of the instance ID is greater than a set maximum NF value MAX_NFS, it indicates that there is no available ID can be assigned to the NF, so the status of the NF turns to NF_NO_IDS. If the instance ID of the NF is being used by a running NF, the status of the NF is set as NF_ID_CONFLICT. If the NF is assigned with the only one available instance ID, the NF is bound to a specified core on a specified node. One or more of instance ID, the node ID, and the core ID information on the NF configuration data structure are updated, and set the tag of the NF as the type tag of the NF. The type tag of the NF may be, for example, the firewall. At the same time, the survival time and the maximum processing packet quantity of the NF are set. If there is no limit, the values are set as 0. After all the variables in the configuration data structure of the NF are set, the status of the NF changes to NF_STARTING. After the NF send a message of the message type of MSG_NF_STARTING to the message queue of the master control program, it is continuously checked whether the status of the NF has been updated to NF_STARTING from NF_WAITING_FOR_ID. If the status is updated to NF_STARTING within the survival time of the NF, it indicates that the master control program has received and processed the message, and has assigned a unique instance ID to the NF. At this time, the running semaphore init_finished of the NF is set as 1, and initialization of the NF is completed.

Preferably, from the memory pool used for message transmission between the master control program and the NF, a message structure is extracted. The message type is set as MSG_NF_READY, and the message data is the information data structure of the NF. Then the message is enqueued into the message queue of the master control program. This message is for notifying the master control program that the NF is ready for packet processing. If the master control program receives a message having the message type of MSG_NF_READY from the NF, it adds 1 to the total quantity of the NF, and the status of the NF is updated to NF_RUNNING. After the NF sends the message having the message type of MSG_NF_READY to the message queue of the master control program, it is continuously checked whether the status of the NF has been updated to NF_RUNNING from NF_STARTING If the status is updated to NF_RUNNING within the survival time of the NF, it indicates that the master control program has received and processed the message. Initialization of the NF is completed and the NF is in its running status. Afterward, the NF starts to run the NF setting functions in its function menu. Some NFs need some functions for configuration before they process packets. For example, a firewall has to read the rule configuration file and introduce preset firewall rules before the NF processes packets. After the NF setting functions are run, the NF continuously checks whether there is any packet in its ring throughout its running time. If there are packets, the packets are read in batch. The batch size for processing is 32 by default, meaning that 32 packets are rea and process at one time. If the number of the packets in the ring is smaller than 32, all of the packets are read out. The NF processes the read-out packets by calling the NF packet processing function from its function menu. After the packets are processed, they are enqueued into the ring queue of the next NF or are sent out from the port. If the survival time of the NF has elapsed or the number of the packets processed reaches the limit, the NF running semaphore running is set as 0.

Step S12 for dynamically allocating the resources to the NF at least comprises: acquiring the flow feature and SLA requirements of the flow, determining the CPU resource demands of the NF according to the measurement results obtained in earlier experiments, looking up the global resource assignment table, initially placing the NF and allocating the CPU resources, and then dynamically adjusting assignment of the CPU resources according to the data from the monitoring module.

The master control program on the master node creates and maintains the global resource assignment table. The global resource assignment table records resource assignment for individual child nodes, and supports dynamic expansion. The variables in the data structure of the global resource table at least comprises one or more of the child node ID, the core ID, the size of the CPU resources of the core that has been assigned, the instance ID of the instance of the NFS stored in the core, and the CPU resource sizes assigned for the individual NFs. Before every NF is assigned with the CPU resources and successfully created, the master control program checks the global resource table to screen out suitable child nodes according to the CPU resources required by the NF. Then the NF is placed on a specified core on the child node having the least interference. This is called initial NF placement and resource assignment. After every NF is assigned with the CPU resources and successfully created, the master control program writes the placement result into the global resource table. This is about adding the instance ID of the NF and the size of the CPU resources assigned to it to the entry of the specified core ID of the child node ID on which the NF is placed.

In practical network environments, the flow rate of the flow is not always constant. Due to fluctuation of the flow rate, the workload on a NFS is time-varying and the demand for resources of a NFS changes with its workload. Static assignment of virtual resources can lead to resource waste or violation of SLA. Thus, the assigned resources have to be dynamically adjusted according to the monitored data. Preferably, for every flow, one variable is reserved to record the previous flow rate. More preferably, when a difference between the currently monitored flow rate and the previous flow rate is greater than a preset threshold, the size of CPU resource assigned to the NF is changed, and the size of CPU resources assigned to the NF and the size of CPU resources assigned to the core in which the NF is present as recorded the global resource assignment table are updated.

Step S13 for migration of the NF at least comprises: if the migration happens in the same child node, rebinding the NF to the core; or if the migration happens cross different nodes, packing the status data of the NF, and creating a new NF in the new node. When the NF has its load increased and thus requires more CPU resources, if the core in which the NF is present is not able to satisfy the CPU demand of the NF, the NF has to be migrated to another core. In this case, it is first to check the global resource table to see whether there is a core in the child node being able to satisfy the resource demand of the NF. Preferably, if there is a core satisfying the resource demand of the NF, the NF is rebound to the core using cgroup. Preferably, if there is not such a core in the same child node, the NF has to be migrated to another node. In this case, the status data of the NF is packed and then transmitted through the flannel network so as to recreate the NF on the new node.

Step S14 for destruction of the NF at least comprises one or more of altering the running semaphore of the NF, ending the NF running process, deleting the data structure related to the NF. Preferably, the NF running semaphore stopped is altered to 1, and the NF running process is ended. If the NF is in the sleep status, it is wakened before the process ends. The value of the NF running semaphore init_finished is checked. If the value of the NF running semaphore init_finished is 0, it indicates that initialization of the NF has not been completed, and the subsequent step for deleting the data structure is not to be performed. If the value of the NF running semaphore init_finished is 1, it indicates that the initialization has been completed, and the next step is to delete the data structure related to the NF. In this case, the ring memory of the NF for storing packets is first released, and then the cache of the tx thread of the NF, the function menu of the NF, and the information pool of the NF are released successively. Also, to be cleared are the corresponding flow table entries in the flow table and the corresponding entries in the global resource assignment table.

Step S15 for reuse of the NF at least comprises: determining whether the reuse conditions are satisfied; if yes, creating a sub-flow table in the NF, and setting the reuse activation flag of the NF as 1.

As proven by the results of the many earlier measurement experiments, reuse of the NF, or having two different flows use the same NF, helps to save CPU resources. However, this is not always true in all cases. Thus, the following CPU reuse activation rules have been established:

(1) there is an NF in the service chain required by the flow that is of the same type as the reused NF.

(2) the flow and all the flows on the reused NF are trustable to each other without one said flow maliciously preempting a CPU processing time for another said flow.

(3) after the reuse, SLA demands of all the flows of the reused NF are satisfied.

(4) after the reuse, an overall CPU resource use rate decreases.

When the all four rules are satisfied, reuse of NFs is advantageous. After a NF is reused, the reuse activation flag of the NF is set as 1, and the NF processes packets from different flows. Therefore, after the NF processes the packets, it checks the flow table, and forwards the packets to the next NF or sends them out from the port according to the flow in which the packet is present. Every NF, after reused, creates a sub-flow table to record the quintuples of the flow so as to differentiate different flows and the corresponding instance IDs in the next NF or the port IDs of the ports where the packets are forwarded out. When a flow on a reused NF ends and the service chain has to be destructed, if the reused NF in the service chain still needs to serve other flows, or if the flow table still has other flow table entries, only the flow table entry in the flow table related to the flow at issue is deleted. If the reused NF in the service chain only needs to serve another flow, or in other words, there is one else entry in the flow table, the flow table entry in the flow table related to the flow at issue is deleted first and the reuse-activating flag of the NF is set as 0.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A container-based network function virtualization (NFV) platform, comprising at least one master node and at least one slave node, and being characterized in that, the master node is configured to, based on interference awareness, assign container-based network functions (NFs) in a master-slave-model-based, distributed computing system that has at least two slave nodes to each said slave node in a manner that relations among characteristics of the to-be-assigned NFs info of load flows of the to-be-assigned NFs, communication overheads between the individual slave nodes, processing performance inside individual slave nodes, and load statuses inside individual said slave nodes are measured, wherein the NFV platform at least comprises a master-node NF scheduling module, a master-slave communication module, and a slave-node NF managing module, in which, the master-node NF scheduling module is configured to perform one or more of the following steps: initializing a flow table; checking the flow table to perform packet forwarding; and creating NFs for data packets of a new flow and allocating CPU resources, the master-slave communication module is configured to perform one or more of the following steps: checking a master-node container IP conversion table IDP, so as to convert an instance ID of a target NF into an IP of a container to which the target NF belongs; and forwarding a packet to the container having the corresponding IP through a cross-host communication network flannel between the containers, and the slave-node NF managing module at least comprises a monitoring module for monitoring running statuses of the NFs and a resource isolating module for realizing resource isolation between different NFs.

2. The NFV platform of claim 1, wherein the step of initializing the flow table at least comprises one or more of the following operations: setting up various parameters for a hash table; calling and using a hash table creation function rte_hash_create of a data plane development kit (DPDK) to create the hash table of the flow table; pre-allocating space for flow table entries of the flow table; and obtaining the flow table ft according to the generated hash table and the flow table entry flow_entryto, the step of checking the flow table to perform packet forwarding at least comprises one or more of the following operations: in the hash table, looking for a key-value pair that corresponds to quintuple information of the currently arriving data packet; and where the corresponding key-value pair that corresponds to quintuple information of the currently arriving data packet is found, identifying a corresponding NF service chain in the flow table entry, and transmitting the packet to the corresponding NF service chain, and the step of creating the NFs for the data packet of the new flow and allocating the CPU resources at least comprises one or more of the following operations: in the hash table, looking for the key-value pair that corresponds to the quintuple information of the currently arriving data packet; and where the corresponding key-value pair is not found, reading a configuration file, creating the NF service chain required by the flow, inserting the corresponding key-value pair into the hash table and inserting the corresponding flow table entry into the flow table, and allocating the CPU resources according to the info of the flow to which the data packet belongs.

3. The NFV platform of claim 2, wherein the master-node NF scheduling module is configured to perform one or more of the following steps: for the arriving data packet, calling and using a function rte_hash_lookup_with_hash provided by the DPDK to check the flow table based on the quintuple information at a packet header of the arriving data packet, if the corresponding flow table entry matching the quintuple information of the arriving data packet is found, identifying the corresponding NF service chain in the flow table entry, and transmitting the packet to the corresponding NF service chain, which is the NF having a first NF instance ID of the service chain, and if the corresponding flow table entry matching the quintuple information of the arriving data packet is not found, reading the configuration file, according to quintuple information match flow rules of the packet, creating a required NF instance, and calling and using a function rte_hash_add_key_with_hash provided by the DPDK to add a new key-value pair to the hash of the flow table, and to add a new flow table entry to the flow table.

4. The NFV platform of claim 3, wherein the master-node NF scheduling module is configured to perform one or more of the following steps: according to the flow info of the flow to which the arriving data packet belongs, allocating the CPU resources to each said NF in the newly created NF service chain according to a CPU resource assignment strategy, and checking each said child node for its NF assignment status and CPU resource usage status, and placing the NFs on the child nodes according to a NF placement strategy, in which, the CPU resource assignment strategy refers to reasonable assignment of the CPU resources to each said NF in the newly created NF service chain using cgroups based on measurement experiment experience, the NF placement strategy refers to selecting at least one child node that satisfies an assignment condition from a plurality of child nodes based on the assignment condition that a size of the idle CPU resources on the child node is greater than a size of CPU resources required by the NF, and placing NF on the child node that has the least interference based on interference-awareness status.

5. The NFV platform of claim 2, wherein at least one said slave node is provided with at least one said monitoring module, and the monitoring module is configured to perform one or more of the following steps: repeatedly reading a data structure of the NF through polling so as to monitor a packet arrival rate and packet latency of the flow, and dynamically adjusting the CPU resource assignment to the NF according to a variation of a demand of the flow, and where a difference between a current packet arrival rate and a previous packet arrival rate recorded in the data structure of the NF is greater than a preset threshold, or where an average latency is greater than an SLA-based maximum packet latency of the flow to which the packet belongs, reallocating the CPU resources to the NF.

6. The NFV platform of claim 5, wherein the monitoring module is further configured to perform one or more of the following steps: monitoring the flow info of the flow it serves and resource usage statuses of the individual NFs, according to variations of the flow info of the flow each said NF serves, correspondingly adjusting the resources the NFs serve, and signaling the master node to modify a global resource table, and at a fine-grained bottom layer, statistically managing the resource usage statuses of the NFs accordingly, so as to realize isolation of the CPU resources among the NFs.

7. A container-based network functions virtualization (NFV) method, at least comprising one or more of the following steps: having a master node based on interference awareness, assign container-based network functions (NFs) in a master-slave-model-based, distributed computing-system that has at least two slave nodes to each said slave node in a manner that relations among characteristics of the NFs, info of load flows of the to-be-assigned NFs, communication overheads between the individual slave nodes, processing performance inside individual slave nodes, and load statuses inside individual said slave nodes are measured, thereby providing the system with NF services, balancing loads among the nodes and adapting the system to dynamic load fluctuation of the flow, wherein the NFV method at least comprising providing a master-node NF scheduling module, a master-slave communication module, and a slave-node NF managing module, the slave-node NF managing module at least comprising a monitoring module and a resource isolating module, wherein, the master-node NF scheduling module performs one or more steps of initializing a flow table; checking the flow table to perform packet forwarding; and creating NFs for data packets of a new flow and allocating CPU resources; the master-slave communication module performs one or more of the following steps: checking a master-node container IP conversion table IDP, so as to convert an instance ID of a target NF into an IP of a container to which the target NF belongs; and forwarding a packet to the container having the corresponding IP through a cross-host communication network flannel between the containers, and the monitoring module monitors running statuses of the NFs, and the resource isolating module realizes isolation of the CPU resources between different NFs.

8. The NFV method of claim 7, wherein the step of initializing the flow table at least comprises one or more of the following operations: setting up various parameters for a hash table; calling and using a hash table creation function rte_hash_create of a data plane development kit (DPDK) to create the hash table of the flow table; pre-allocating space for flow table entries of the flow table; and obtaining the flow table ft according to the generated hash table and the flow table entry flow_entryto, the step of checking the flow table to perform packet forwarding at least comprises one or more of the following operations: in the hash table, looking for a key-value pair that corresponds to quintuple information of the currently arriving data packet; and where the corresponding key-value pair that corresponds to quintuple information of the currently arriving data packet is found, identifying a corresponding NF service chain in the flow table entry, and transmitting the packet to the corresponding NF service chain, and the step of creating the NFs for the data packet of the new flow and allocating the CPU resources at least comprises one or more of the following operations: in the hash table, looking for the key-value pair that corresponds to the quintuple information of the currently arriving data packet; and where the corresponding key-value pair is not found, reading a configuration file, creating the NF service chain required by the flow, inserting the corresponding key-value pair into the hash table and inserting the corresponding flow table entry into the flow table, and allocating the CPU resources according to the info of the flow to which the data packet belongs.

9. The NFV method of claim 8, wherein the master-node NF scheduling module is configured to perform one or more of the following steps: for the arriving data packet, calling and using a function rte_hash_lookup_with_hash provided by the DPDK to check the flow table based on the quintuple information at a packet header of the arriving data packet, if the corresponding flow table entry matching the quintuple information of the arriving data packet is found, identifying the corresponding NF service chain in the flow table entry, and transmitting the packet to the corresponding NF service chain, which is the NF having a first NF instance ID of the service chain, and if the corresponding flow table entry matching the quintuple information of the arriving data packet is not found, reading the configuration file, according to quintuple information match flow rules of the packet, creating a required NF instance, and calling and using a function rte_hash_add_key_with_hash provided by the DPDK to add a new key-value pair to the hash of the flow table, and to add a new flow table entry to the flow table.

10. The NFV method of claim 9, wherein the master-node NF scheduling module is configured to perform one or more of the following steps: according to the flow info of the flow to which the arriving data packet belongs, allocating the CPU resources to each said NF in the newly created NF service chain according to a CPU resource assignment strategy, and checking each said child node for its NF assignment status and CPU resource usage status, and placing the NFs on the child nodes according to a NF placement strategy, in which, the CPU resource assignment strategy refers to reasonable assignment of the CPU resources to each said NF in the newly created NF service chain using cgroups based on measurement experiment experience, the NF placement strategy refers to selecting at least one child node that satisfies an assignment condition from a plurality of child nodes based on the assignment condition that a size of the idle CPU resources on the child node is greater than a size of CPU resources required by the NF, and placing NF on the child node that has the least interference based on interference-awareness status.

11. The NFV method of claim 10, wherein at least one said slave node is provided with at least one said monitoring module, and the monitoring module is configured to perform one or more of the following steps: repeatedly reading a data structure of the NF through polling so as to monitor a packet arrival rate and packet latency of the flow, and dynamically adjusting the CPU resource assignment to the NF according to a variation of a demand of the flow, and where a difference between a current packet arrival rate and a previous packet arrival rate recorded in the data structure of the NF is greater than a preset threshold, or where an average latency is greater than an SLA-based maximum packet latency of the flow to which the packet belongs, reallocating the CPU resources to the NF.

12. The NFV method of claim 11, wherein the monitoring module is further configured to perform one or more of the following steps: monitoring the flow info of the flow it serves and resource usage statuses of the individual NFs, according to variations of the flow info of the flow each said NF serves, correspondingly adjusting the resources the NFs serve, and signaling the master node to modify a global resource table, and at a fine-grained bottom layer, statistically managing the resource usage statuses of the NFs accordingly, so as to realize isolation of the CPU resources among the NFs.

13. A Network Function (NF) management framework, being provided by a container-based network functions virtualization (NFV) platform, and being configured to: for any arriving packet, use the container-based NFV platform to perform one or more of checking a flow table, performing transmission over a custom NF service chain and monitoring a flow to which the arriving packet belong; and for any NF, use the container-based NFV platform to perform one or more of creation, dynamic resource assignment, migration, destruction, and reuse based on CPU reuse rules, in which, the CPU reuse-rules at least comprises one or more of R1 through R4, R1: there is an NF in the service chain required by the flow that is of the same type as the reused NF; R2: the flow and all the flows on the reused NF are trustable to each other without one said flow maliciously preempting a CPU processing time for another said flow; R3: after the reuse, SLA demands of all the flows of the reused NF are satisfied; R4: after the reuse, an overall CPU resource use rate decrease, wherein the container-based network functions virtualization (NFV) platform comprises at least one master node and at least one slave node, the master node is configured to, based on interference awareness, assign container-based network functions (NFs) in a master-slave-model-based, distributed computing system that has at least two slave nodes to each said slave node in a manner that relations among characteristics of the to-be-assigned NFs, info of load flows of the to-be-assigned NFs, communication overheads between the individual slave nodes, processing performance inside individual slave nodes, and load statuses inside individual said slave nodes are measured, wherein the NFV platform at least comprises a master-node NF scheduling module, a master-slave communication module, and a slave-node NF managing module, in which, the master-node NF scheduling module is configured to perform one or more of the following steps: initializing a flow table; checking the flow table to perform packet forwarding; and creating NFs for data packets of a new flow and allocating CPU resources, the master-slave communication module is configured to perform one or more of the following steps: checking a master-node container IP conversion table IDP, so as to convert an instance ID of a target NF into an IP of a container to which the target NF belongs; and forwarding a packet to the container having the corresponding IP through a cross-host communication network flannel between the containers, and the slave-node NF managing module at least comprises a monitoring module for monitoring running statuses of the NFs and a resource isolating module for realizing resource isolation between different NFs.

14. The NF management framework of claim 13, wherein the step of initializing the flow table at least comprises one or more of the following operations: setting up various parameters for a hash table; calling and using a hash table creation function rte_hash_create of a data plane development kit (DPDK) to create the hash table of the flow table; pre-allocating space for flow table entries of the flow table; and obtaining the flow table ft according to the generated hash table and the flow table entry flow_entryto, the step of checking the flow table to perform packet forwarding at least comprises one or more of the following operations: in the hash table, looking for a key-value pair that corresponds to quintuple information of the currently arriving data packet; and where the corresponding key-value pair that corresponds to quintuple information of the currently arriving data packet is found, identifying a corresponding NF service chain in the flow table entry, and transmitting the packet to the corresponding NF service chain, and the step of creating the NFs for the data packet of the new flow and allocating the CPU resources at least comprises one or more of the following operations: in the hash table, looking for the key-value pair that corresponds to the quintuple information of the currently arriving data packet; and where the corresponding key-value pair is not found, reading a configuration file, creating the NF service chain required by the flow, inserting the corresponding key-value pair into the hash table and inserting the corresponding flow table entry into the flow table, and allocating the CPU resources according to the info of the flow to which the data packet belongs.

15. The NF management framework of claim 14, wherein the master-node NF scheduling module is configured to perform one or more of the following steps: for the arriving data packet, calling and using a function rte_hash_lookup-_with_hash provided by the DPDK to check the flow table based on the quintuple information at a packet header of the arriving data packet, if the corresponding flow table entry matching the quintuple information of the arriving data packet is found, identifying the corresponding NF service chain in the flow table entry, and transmitting the packet to the corresponding NF service chain, which is the NF having a first NF instance ID of the service chain, and if the corresponding flow table entry matching the quintuple information of the arriving data packet is not found, reading the configuration file, according to quintuple information match flow rules of the packet, creating a required NF instance, and calling and using a function rte_hash_add_key_with_hash provided by the DPDK to add a new key-value pair to the hash of the flow table, and to add a new flow table entry to the flow table.

16. The NF management framework of claim 15, wherein the master-node NF scheduling module is configured to perform one or more of the following steps: according to the flow info of the flow to which the arriving data packet belongs, allocating the CPU resources to each said NF in the newly created NF service chain according to a CPU resource assignment strategy, and checking each said child node for its NF assignment status and CPU resource usage status, and placing the NFs on the child nodes according to a NF placement strategy, in which, the CPU resource assignment strategy refers to reasonable assignment of the CPU resources to each said NF in the newly created NF service chain using cgroups based on measurement experiment experience, the NF placement strategy refers to selecting at least one child node that satisfies an assignment condition from a plurality of child nodes based on the assignment condition that a size of the idle CPU resources on the child node is greater than a size of CPU resources required by the NF, and placing NF on the child node that has the least interference based on interference-awareness status.

* * * * *